United States Patent
Jakimov et al.

(10) Patent No.: US 9,694,568 B2
(45) Date of Patent: Jul. 4, 2017

(54) METHOD FOR COATING COMPONENTS

(71) Applicant: MTU Aero Engines AG, Munich (DE)

(72) Inventors: Andreas Jakimov, Munich (DE); Stefan Schneiderbanger, Lauterbach (DE); Manuel Hertter, Munich (DE)

(73) Assignee: MTU Aero Engines AG, Munich (DE)

( * ) Notice: Subject to any disclaimer, the term of this patent is extended or adjusted under 35 U.S.C. 154(b) by 578 days.

(21) Appl. No.: 14/308,532

(22) Filed: Jun. 18, 2014

(65) Prior Publication Data

US 2014/0360664 A1 Dec. 11, 2014

Related U.S. Application Data

(62) Division of application No. 12/994,433, filed as application No. PCT/DE2009/000720 on May 26, 2009.

(30) Foreign Application Priority Data

May 28, 2008 (DE) .................. 10 2008 025 510

(51) Int. Cl.
- B32B 3/10 (2006.01)
- B32B 37/24 (2006.01)
- B05B 15/04 (2006.01)
- C23C 24/04 (2006.01)

(52) U.S. Cl.
CPC ............ *B32B 37/24* (2013.01); *B05B 15/045* (2013.01); *B32B 3/10* (2013.01); *C23C 24/04* (2013.01); *B32B 2037/243* (2013.01); *B32B 2255/00* (2013.01)

(58) Field of Classification Search
CPC ............ B05B 15/045; B32B 2037/243; B32B 2255/00; B32B 37/24; B32B 3/10; C23C 24/04
USPC ................................ 156/279; 427/180, 421.1
See application file for complete search history.

(56) References Cited

U.S. PATENT DOCUMENTS

| | | | |
|---|---|---|---|
| 4,396,503 A | 8/1983 | Schmidt | |
| 4,536,270 A | 8/1985 | Johnson | |
| 5,090,354 A | 2/1992 | Fereretti | |
| 8,173,218 B2 * | 5/2012 | Mase | .................... B05B 15/045 |
| | | | 118/505 |

FOREIGN PATENT DOCUMENTS

| | | |
|---|---|---|
| EP | 0 799 654 A1 | 10/1997 |
| EP | 0 927 773 A2 | 7/1999 |
| EP | 1 762 303 A1 | 3/2007 |
| GB | 1 526 531 A | 9/1978 |

* cited by examiner

*Primary Examiner* — Alexander Weddle
(74) *Attorney, Agent, or Firm* — Crowell & Moring LLP

(57) ABSTRACT

A method for coating a component of a turbomachine is disclosed. The method includes covering a first surface of the component with a covering device, where the covering device is profiled in a zigzag shape. The method further includes applying a coating material via cold kinetic compaction or kinetic cold gas spraying on the component such that a second surface of the component is coated with the coating material and such that particles of the coating material are deflected off of the covering device so that the particles do not adhere to the covering device.

8 Claims, 1 Drawing Sheet

METHOD FOR COATING COMPONENTS

This application is a divisional of prior U.S. application Ser. No. 12/994,433, filed Nov. 23, 2010, which was the National Stage of International Application No. PCT/DE2009/000720, filed May 26, 2009, and claims the priority of German Patent Document No. 10 2008 025 510.6, filed May 28, 2008, the disclosures of which are expressly incorporated by reference herein.

BACKGROUND AND SUMMARY OF THE INVENTION

The invention relates to a covering device for the coating of components via cold kinetic compaction and a method for coating components via cold kinetic compaction.

Coating components of a turbomachine via cold kinetic compaction or kinetic cold gas spraying is already known from practice, wherein, in this case, a coating is applied to a to-be-coated component in that particles of a coating material are directed at a to-be-coated surface of the component that is being coated with the aid of a carrier gas. In this connection, a flat coating of the surface of the component being coated is always being carried out.

Then, if only sections of a component are supposed to coated, i.e., if a region of the surface of the component being coated is supposed to be coated and another region of the surface of the component being coated is not supposed to be coated, the not-to-be-coated region of the surface of the to-be-coated component must be covered with the aid of a covering device. Covering devices, which can be used to cover the regions of the surface that are not to be coated, are already known for coating methods such as thermal spraying. These covering devices for thermal spraying that are known from the prior art are not suitable, however, for use when coating components via cold kinetic compaction. Thus, the covering devices known from practice would themselves be coated and had to be disposed of after the coating process.

Starting herefrom, the object of the present invention is creating a novel covering device for the coating of components via cold kinetic compaction or kinetic cold gas spraying and a method for coating components.

According to the invention, the covering device is profiled such that it encloses such an acute angle with that region of the surface which is to be covered by same and therefore is not to be coated, that particles of a coating material can be deflected from the component such that the particles do not adhere to the covering device.

The covering device according to the invention is suitable especially for the coating of sections of components via cold kinetic compaction or kinetic cold gas spraying. Thus, in the case of the covering device according to the invention, there is no danger that the covering device itself will be coated by the coating material. As a result, it is possible to use the covering device according to the invention as frequently as desired. This makes economical, sectional coating of components via cold kinetic compaction possible. As already mentioned, covering devices that have been adapted true-to-contour can be used multiple times.

Preferred further developments of the invention are disclosed in the following description. Without being limited hereto, exemplary embodiments of the invention will be explained in more detail on the basis of the drawings.

DETAILED DESCRIPTION OF THE DRAWINGS

The present invention relates to the coating of components, particularly components of a gas turbine, via cold kinetic compaction or kinetic cold gas spraying.

In the case of cold kinetic compaction or kinetic cold gas spraying, particles of a coating material are applied to form the coating on the component with the aid of a carrier gas, namely on a to-be-coated surface of the component.

Figure 1:
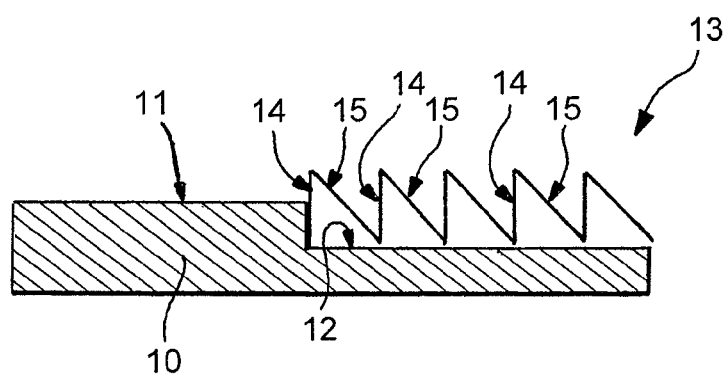
FIG. 1 is a first embodiment of a covering device according to the invention for the coating of components via cold kinetic compaction or kinetic cold gas spraying.

FIG. 1 shows a rough diagram of a component 10 to be coated via cold kinetic compaction or kinetic cold gas spraying, wherein the to-be-coated component 10 is supposed to be coated in a first region 11 of a surface and not to be coated in a second region 12 of the surface.

The region 12 of the surface of the component 10 that is not supposed to be coated can be covered with a covering device 13 according to the invention, wherein the inventive covering device 13 is profiled such that it encloses such an acute angle with that region 12 of the surface of the component which is to be covered by same, and therefore is not to be coated, that particles of a coating material can be deflected from the component 10 such that the particles do not adhere to the covering device 13.

According to FIG. 1, to this end, the covering device 13 is profiled in a zigzag shape, wherein first sections 14 enclose a right angle with the not-to-be-coated region 12 of the surface of the component 10, and wherein second sections 15 of the covering device 13, which are respectively positioned between two adjacent first sections 14, enclose a smaller angle with the not-to-be-coated region 12 of the surface of the component 10, which is at least 30°, however. This makes it possible to guarantee that particles of a coating material, which are directed at the surface of the component 10 at a right angle, ricochet off the second sections 15 of the covering device 13 according to the invention and are thereby deflected from the component 10. Neither the not-to-be-coated region 12 of the surface of the component 10 nor the covering device 13 are coated in the process so that it is possible to use the covering device as frequently as desired.

In order to avoid damage to the covering device 13 from the high particle velocity during cold kinetic compaction, the covering device is fabricated of a hard material, e.g., of a metallic material or a hard plastic.

Figure 2:
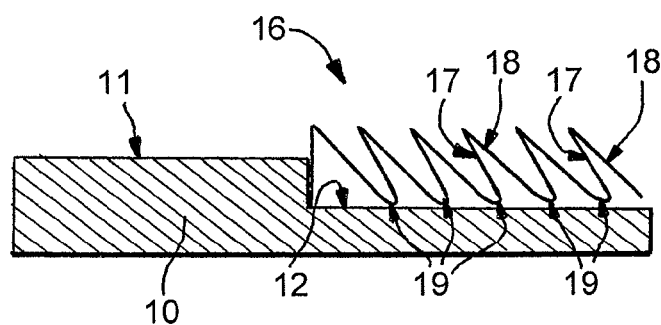
FIG. 2 is a second embodiment of a covering device according to the invention for the coating of components via cold kinetic compaction or kinetic cold gas spraying.

FIG. 2 shows the to-be-coated component 10 with a covering device 16 according to a second exemplary embodiment of the present invention, wherein the covering device 16 is profiled in turn in a zigzag shape just like the covering device 13. In the case of the covering device 16 in FIG. 2, the covering device has first sections 17, which enclose an angle of between 30° and 90° with the not-to-be-coated region 12 of the surface of the component. Second sections 18, which are positioned respectively between two adjacent first sections 17 of the covering device 16, enclose a smaller angle with the not-to-be-coated region 12 of the surface of the component 10, namely an angle of at least 30°.

This makes it possible to guarantee that depressions 19 of the covering device 16 according to the invention, which are configured between the first sections 17 and the second sections 18 of the covering device, are completely covered in the transport direction of the coating material during cold kinetic compaction so that no particles whatsoever of the coating material can reach the region of the depression 19.

The depressions 19 are thus situated in a so-called "shadow of the spray" during cold kinetic compaction so that there is no danger whatsoever that the depressions 19 of the covering device 16 will be coated.

What is claimed is:

1. A method for coating a component of a turbomachine, comprising the steps of:
    covering a first surface of the component with a covering device, wherein the covering device is profiled in a zigzag shape; and
    applying a coating material via cold kinetic compaction or kinetic cold gas spraying on the component such that a second surface of the component is coated with the coating material and such that particles of the coating material are deflected off of the covering device so that the particles do not adhere to the covering device.

2. The method according to claim 1, wherein the covering device is profiled such that the covering device includes a plurality of first sections and a plurality of second sections, wherein each of the first sections is disposed at a right angle with respect to the first surface, wherein each of the second sections is disposed at an angle of at least 30° with respect to the first surface, and wherein each of the second sections is positioned between two respective adjacent first sections.

3. The method according to claim 2, wherein particles of the coating material that are directed at the first surface of the component at a right angle with respect to the first surface are deflected off of the second sections.

4. The method according to claim 1, wherein the covering device is profiled such that the covering device includes a plurality of first sections and a plurality of second sections, wherein each of the first sections is disposed at a first angle between 30° and 90° with respect to the first surface, wherein each of the second sections is disposed at a second angle with respect to the first surface that is smaller than the first angle, and wherein each of the second sections is positioned between two respective adjacent first sections.

5. The method according to claim 4, wherein the second angle is at least 30°.

6. The method according to claim 4, wherein a depression is formed between an adjacent first section and a second section and wherein no particles of the coating material reach a region of the depression.

7. The method according to claim 1, wherein the covering device is formed of a metallic material.

8. The method according to claim 1, wherein the covering device is formed of a hard plastic.

* * * * *